US011328271B2

(12) United States Patent
Malhotra et al.

(10) Patent No.: US 11,328,271 B2
(45) Date of Patent: *May 10, 2022

(54) SYSTEMS AND METHODS FOR USE IN TRANSFERRING FUNDS BETWEEN PAYMENT ACCOUNTS

(71) Applicant: MASTERCARD INTERNATIONAL INCORPORATED, Purchase, NY (US)

(72) Inventors: Sandeep Malhotra, Stamford, CT (US); Ian David Alan Maddocks, Milton Keynes (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 26 days.

This patent is subject to a terminal disclaimer.

(21) Appl. No.: 16/920,273

(22) Filed: Jul. 2, 2020

(65) Prior Publication Data
US 2020/0334647 A1 Oct. 22, 2020

Related U.S. Application Data

(63) Continuation of application No. 15/238,000, filed on Aug. 16, 2016, now Pat. No. 10,740,735.
(Continued)

(51) Int. Cl.
*G06Q 20/00* (2012.01)
*G06Q 20/10* (2012.01)
(Continued)

(52) U.S. Cl.
CPC .......... *G06Q 20/10* (2013.01); *G06Q 20/223* (2013.01); *G06Q 20/3274* (2013.01); *G06Q 20/3276* (2013.01)

(58) Field of Classification Search
CPC .. G06Q 20/10; G06Q 20/223; G06Q 20/3274; G06Q 20/3276
(Continued)

(56) References Cited

U.S. PATENT DOCUMENTS 10,740,735 B2 * 8/2020 Malhotra ........... G06Q 20/3276
2004/0117250 A1 6/2004 Lubow et al.
(Continued)

FOREIGN PATENT DOCUMENTS

CN 102184604 A 9/2011
CN 102222294 A 10/2011
(Continued)

OTHER PUBLICATIONS

"MasterCard Money Send"; https://developer.mastercard.com/portal/display/api/MoneySend; accessed Feb. 25, 2016; 6pgs.

*Primary Examiner* — Daniel A Hess
(74) *Attorney, Agent, or Firm* — Harness, Dickey & Pierce, P.L.C.

(57) ABSTRACT

Systems and methods are provided for use in facilitating fund transfers between source accounts and destination accounts. One exemplary method includes capturing a computer-readable indicia representative of: a destination account identifier specific to a destination account of a first party and a name of the first party associated with the destination account and, in response to the captured indicia, displaying the name of the first party as a confirmation that the first party is associated with the destination account. The method also includes identifying a source account identifier associated with a source account based on a selection of the source account or on the source account being a default account, and compiling and transmitting a transfer request for a fund transfer based on: the destination account identifier, the source account identifier associated with the identified source account, and a payment amount for the fund transfer.

15 Claims, 4 Drawing Sheets

Related U.S. Application Data

(60) Provisional application No. 62/306,033, filed on Mar. 9, 2016.

(51) Int. Cl.
   *G06Q 20/32* (2012.01)
   *G06Q 20/22* (2012.01)

(58) Field of Classification Search
   USPC .................................................. 235/462.01
   See application file for complete search history.

(56) References Cited

U.S. PATENT DOCUMENTS

| | | |
|---|---|---|
| 2008/0126251 A1 | 5/2008 | Wassingbo |
| 2008/0222048 A1 | 9/2008 | Higgins et al. |
| 2008/0249928 A1 | 10/2008 | Hill et al. |
| 2010/0042538 A1 | 2/2010 | Dheer et al. |
| 2013/0013499 A1 | 1/2013 | Kalgi |
| 2013/0166441 A1 | 6/2013 | Kobylkin et al. |
| 2013/0173405 A1 | 7/2013 | Gouessant |
| 2013/0198081 A1 | 8/2013 | Royyuru et al. |
| 2013/0238492 A1 | 9/2013 | Mutha et al. |
| 2014/0006184 A1 | 1/2014 | Godsey |
| 2014/0040051 A1 | 2/2014 | Ovick et al. |
| 2014/0372308 A1 | 12/2014 | Sheets |
| 2015/0310421 A1 | 10/2015 | Xie et al. |
| 2016/0247141 A1 | 8/2016 | Graylin et al. |
| 2017/0262819 A1 | 9/2017 | Malhotra et al. |
| 2017/0262832 A1 | 9/2017 | Deshpande et al. |

FOREIGN PATENT DOCUMENTS

| | | |
|---|---|---|
| CN | 103778531 A | 5/2014 |
| CN | 104303197 A | 1/2015 |
| EP | 1528518 A1 | 5/2005 |
| WO | WO2016/018255 | 2/2016 |

\* cited by examiner

SYSTEMS AND METHODS FOR USE IN TRANSFERRING FUNDS BETWEEN PAYMENT ACCOUNTS

CROSS-REFERENCE TO RELATED APPLICATIONS

This application is a continuation of U.S. patent application Ser. No. 15/238,000 filed on Aug. 16, 2016, which claims the benefit of, and priority to, U.S. Provisional Application No. 62/306,033 filed on Mar. 9, 2016. The entire disclosure of each of the above applications is incorporated herein by reference.

FIELD

The present disclosure generally relates to systems and methods for use in transferring funds between financial accounts, for example, from source accounts to destination accounts, and in particular, for use in identifying the destination accounts based on computer-readable indicia associated with the destination accounts.

BACKGROUND

This section provides background information related to the present disclosure which is not necessarily prior art.

Payment accounts are used by consumers to perform numerous different transactions including, for example, purchasing products (e.g., goods and/or services) from merchants, transferring funds to other individuals, etc. Credentials for identification and use of the payment accounts are typically distributed to the consumers by issuers of the payment accounts in the form of account devices such as payment cards, fobs, and electronic wallet applications. Such account devices then include primary account numbers (PANs) or tokens associated with the payment accounts, for use in identifying the payment accounts in the different transactions. Separately, it is known that many consumers own or have access to computing devices capable of scanning/capturing and interpreting barcodes, such as mobile phones with built-in cameras.

DRAWINGS

The drawings described herein are for illustrative purposes only of selected embodiments and not all possible implementations, and are not intended to limit the scope of the present disclosure.

Figure 1:
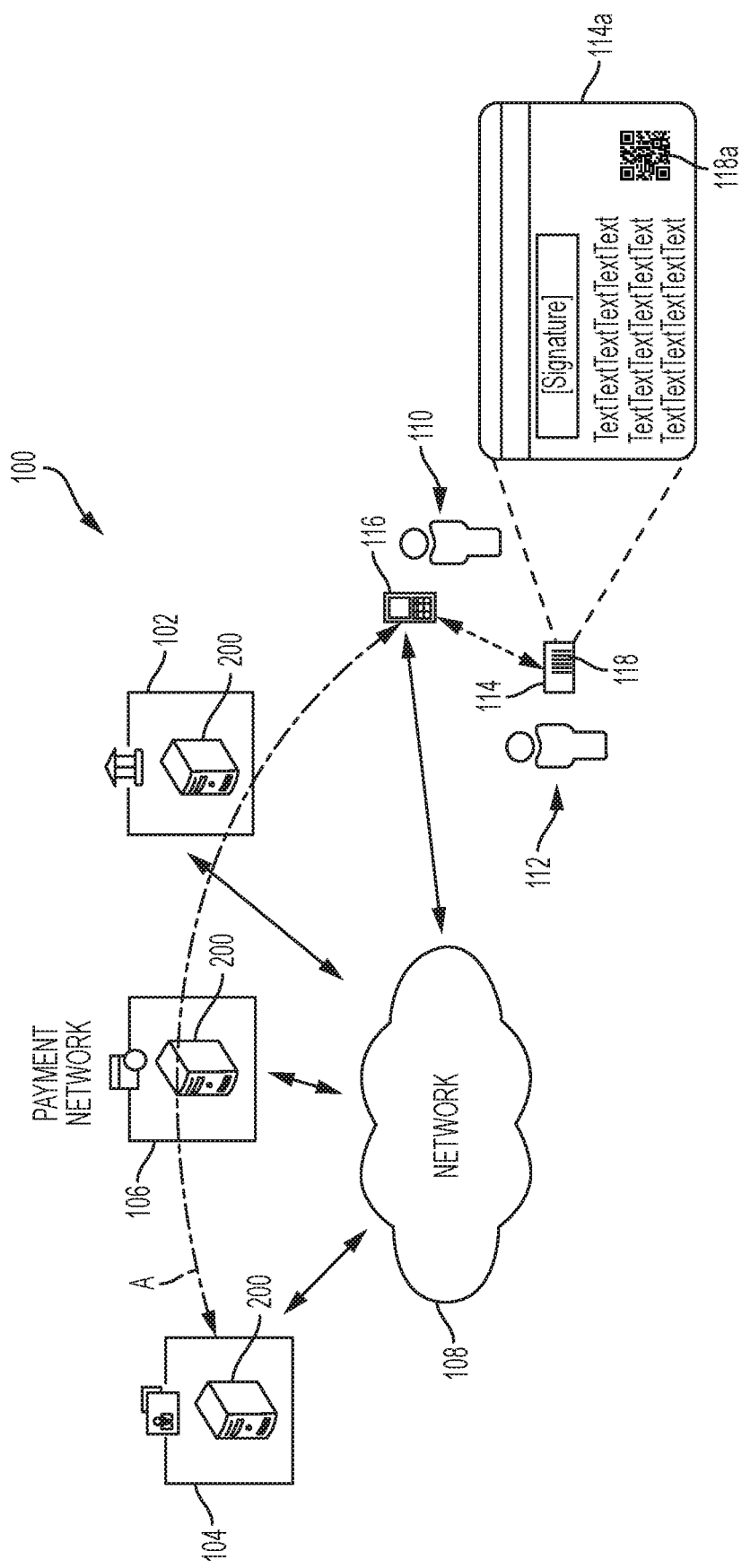
FIG. 1 is an exemplary system of the present disclosure suitable for use in transferring funds between payment accounts using computer-readable indicia to identify destination accounts to receive the transferred funds.
Figure 3:
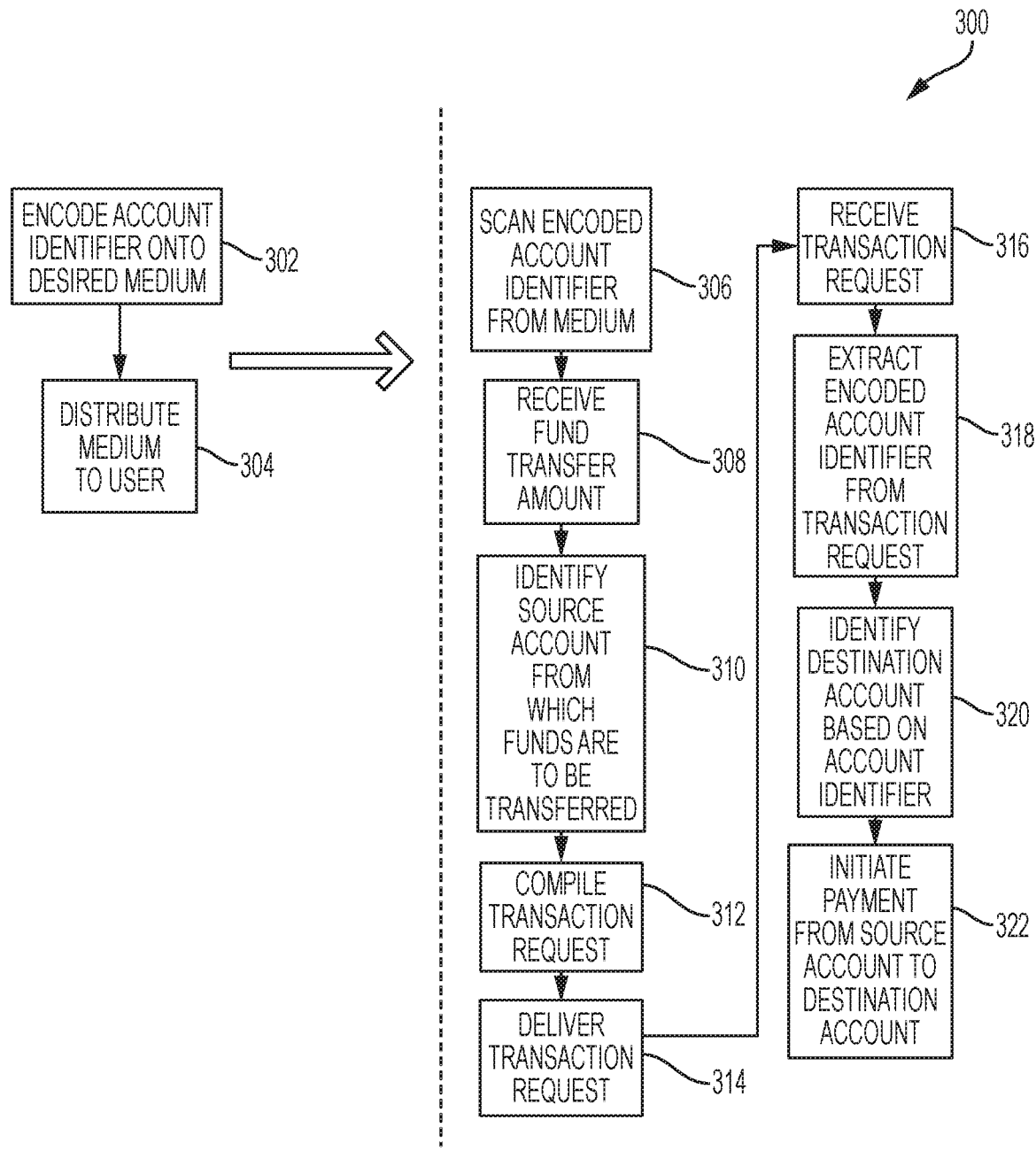
Figure 4:
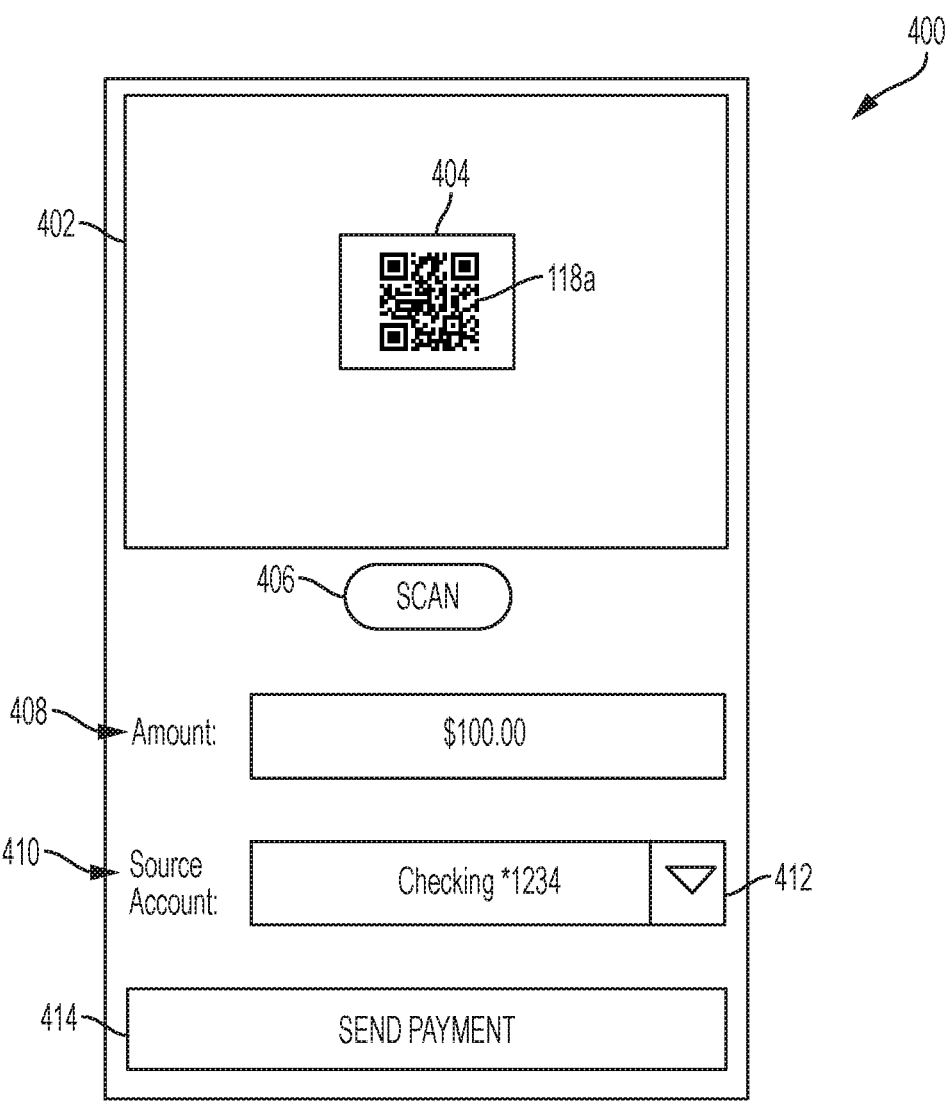

FIG. 3 is an exemplary method, which may be implemented in connection with the system of FIG. 1, for transferring funds from a source account to a destination account, wherein the destination account is identified based on computer-readable indicia representative of a primary account number (PAN) for the destination account; and FIG. 4 is an exemplary interface associated with a fund transfer application, which may be used in connection with the system of FIG. 1 and/or the method of FIG. 3.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Access devices, such as credit cards, debit cards, fobs, virtual or digital cards, and the like, are often associated with payment accounts, and are carried by a large percentage of consumers to effect use of payment accounts. Increasingly, consumers desire to transfer funds, with other consumers, directly through use of their payment accounts. Uniquely, the systems and methods herein enable such direct fund transfers between consumers via computer-readable indicia (e.g., located on the access devices, etc.), used to identify recipients' payment accounts for receiving the transferred funds. For example, consumers may initiate fund transfers to desired recipients by scanning computer-readable indicia associated with payment accounts for the recipients receiving the funds, whereby the funds are then transferred from the consumers' payment accounts to the recipients' payment accounts. As such, the fund transfers are substantially simplified, and additional security is provided via use of the computer-readable indicia (to essentially hide primary account numbers for the recipients' payment accounts).

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, implementation of fund transfers in the system 100, involvement of different parts of the system 100 in connection with such fund transfers, etc.

The system 100 generally includes financial institutions 102, 104 and a payment network 106, each coupled to and in communication with communications network 108. The communications network 108 may include, without limitation, a local area network (LAN), a wide area network (WAN) (e.g., the Internet, etc.), a mobile network, a virtual private network, and/or another suitable public and/or private network capable of supporting communication among two or more of the parts illustrated in FIG. 1, or any combination thereof. For example, communications network 108 may include multiple different networks, such as a private transaction network made accessible by the payment network 106 to the financial institutions 102, 104 and, separately, the public Internet, which may be accessible to consumers 110, 112, as well as other parts of the system 100, etc. as desired.

The two consumers 110, 112 of the system 100 are each associated with an account (e.g., a credit account, a deposit account, a savings account, combinations thereof, etc.) that is accessible via payment network 106. In addition in the system 100, the account associated with the consumer 110 is provided by the financial institution 102, and the account associated with the consumer 112 is provided by the financial institution 104 (although this separation is not required in all embodiments). And, through their accounts, the consumers 110, 112 are able to receive and/or transfer funds, as described herein (e.g., with the financial institutions 102, 104 then acting as issuers, acquirers, etc. in the various transactions, as appropriate). While only two consumers 110, 112 and two financial institutions 102, 104 are illustrated in FIG. 1, it should be appreciated that the system 100 may include any desired numbers of consumers and/or financial institutions within the scope of the present disclosure.

Also in the system 100, the consumer 112 is in possession of an account access device 114 associated with his/her account (e.g., a credit card, a debit card, a fob, a smartcard, a sticker, a communication device enabled for transactions via an electronic wallet application, another device, etc.). While not illustrated, the consumer 110 may also be in possession of an account access device associated with his/her account. The account access device 114 is provided and/or issued to the consumer 112 by the financial institution 104, for example, in connection with providing the account to the consumer 112. Further in the system 100, the consumer 110 is associated with a communication device 116, use of which, in connection with transferring funds as described herein, will be described in more detail hereinafter. The consumer 112 may also be associated with a communication device in various embodiments.

Figure 2:
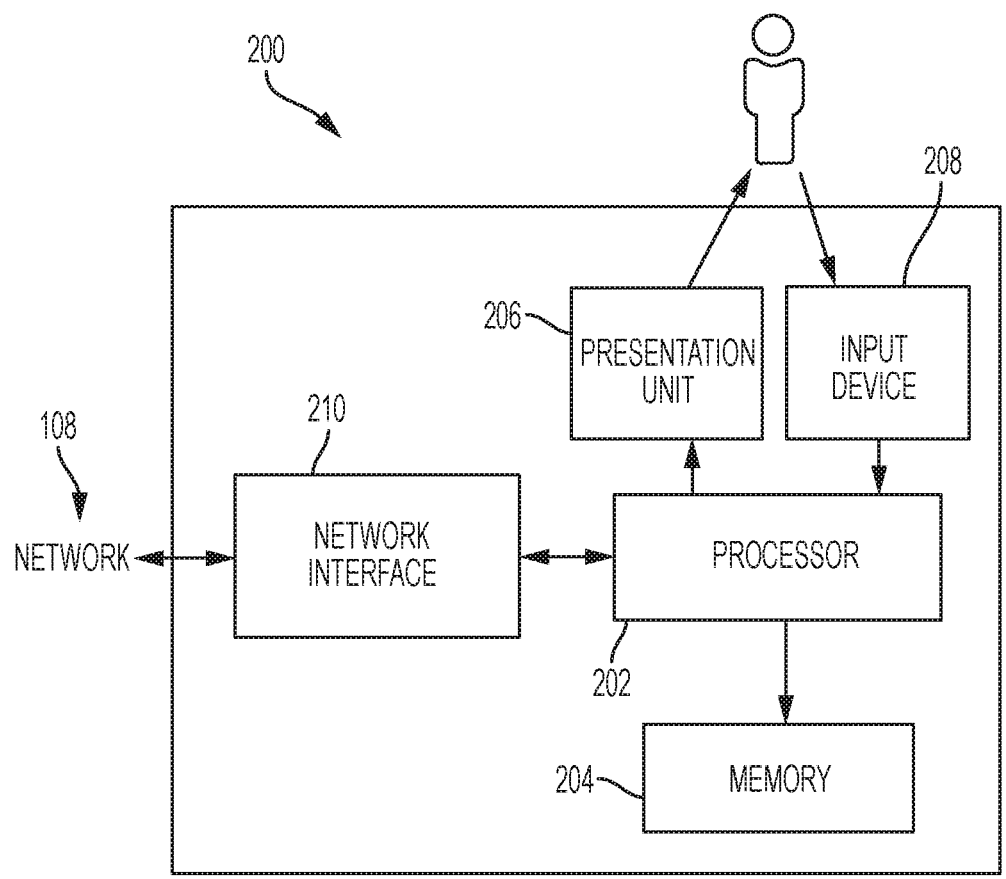
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, ATMs, etc. In addition, the computing device 200 may include a single computing device, or it may include multiple computing devices located in close proximity or distributed over a geographic region, so long as the computing devices are configured to function as described herein. However, the system 100 should not be considered to be limited to the computing device 200, as described below, as different computing devices and/or arrangements of computing devices may be used. In addition, different components and/or arrangements of components may be used in other computing devices.

In the system 100, each of the financial institutions 102, 104 and the payment network 106 are illustrated as including, or being implemented in, computing device 200, coupled to the communications network 108. In addition, the communication device 116 illustrated in FIG. 1 may be considered a computing device consistent with computing device 200. It should be appreciated that the communication device 116 may include any suitable computing device such as, for example, a mobile phone (e.g., a smartphone, etc.), a tablet, a laptop, etc.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, account information, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., fund transfer application interfaces, etc.), visually, for example, to a user of the computing device 200 such as the consumer 110; the consumer 112; users associated with one or more of the financial institution 102, 104 and/or the payment network 106; etc. Various interfaces (e.g., as defined by internet-based applications, websites, etc.) may be displayed at computing device 200, and in particular at presentation unit 206, to display certain information, as described herein. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, PANs, indicia of PANs, other account details, etc. The input device 208 is coupled to (and is in communication with) the processor 202 and may include, for example, one or more of a keyboard, a pointing device, a mouse, a stylus, a card reader, another data or symbol reader (for reading data or other symbols as referenced herein), a camera, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the communications network 108. Further, in some exemplary embodiments, the computing device 200 includes the processor 202 and one or more network interfaces incorporated into or with the processor 202.

Referring again to FIG. 1, the access device 114 associated with the consumer 112 in the system 100 includes a computer-readable indicia 118. The computer-readable indicia 118 generally includes encoded data, relating to the account of the consumer 112, in visual or optical form, or in another form detectable by a computing device. The computer-readable indicia 118 may be encoded such that it is interpretable by the communication device 116 (e.g., computing device 200, etc.), as will be described, but designed so as not to be interpreted (or interpretable) by people (e.g., by consumers 110, 112, etc.) (as compared to conventional implementations where a PAN, for example, is printed on a device in a straight numerical format, easily readable by people). It should be appreciated that the computer-readable indicia 118 of the access device 114 is readable by the communication device 116, so long as the communication device is configured with an appropriate input device 208 and/or associated application, for example, but, again, is relatively difficult to interpret by a person who merely sees the computer-readable indicia 118.

More particularly, the computer-readable indicia 118 generally includes (e.g., is encoded with, etc.) an account identifier (or multiple account identifiers) for the account associated with the consumer 112 (e.g., indicative of account information necessary to effect a deposit to the consumer's account, etc.). The account identifier may include, for example, a PAN associated with the consumer's account, or it may include a token (or multiple tokens) associated with the consumer's account/PAN. Further, in some embodiments, the account identifier may include demand deposit account (DDA) information or the like, enabling fund transfer via an automated clearing house (ACH). In addition, the computer-readable indicia 118 may include other information encoded therein that directly or indirectly identifies the consumer's account. For instance, the computer-readable indicia 118 may also include an account name, the name of the consumer 112 associated with the account, the name of the financial institution 104 associated with the account, etc. Such additional information, when included with the computer-readable indicia 118, may enable a scanning computing device (such as the communication device 116) to display or otherwise indicate to the user (such as consumer 110) a name associated with the account identifier included in the computer-readable indicia 118, etc. The user (e.g., consumer 110) may then confirm that the scanned account identifier is associated with the desired account into which funds are to be transferred (and/or the consumer 112, for example, to whom funds are to be transferred). In other embodiments, when the computer-readable indicia 118 is used to support payment of an invoice, for example, the information encoded in the computer-readable indicia 118 could also include an amount due in connection with the invoice, etc.

As an example, the computer-readable indicia 118 on the access device 114 may include the PAN for the account of the consumer 112, and a token (or multiple tokens) for use with other devices (although, the same token may be used for all devices in some embodiments, including the access device 114). When used, the PAN and/or token may further enable only deposits to the consumer's account, preventing withdrawals based on the PAN and/or token (although this is not required in all embodiments). Such PAN-based and/or token-based rules may be enforced by the financial institution 104 or their service providers (not shown), for example, while processing transaction/transfer requests to the consumer's account. For instance, if a token is issued to the consumer 112 which enables only deposits to the consumer's account, and a transfer request for a withdrawal, or debit, from the consumer's account, including the deposit-only token, is sent to the financial institution 104 associated with the account, the financial institution 104 may deny and/or decline the transaction/transfer, preventing the withdrawal from occurring. Thus, in this example, the consumer 112 may use the token in association with computer-readable indicia 118 printed, for example, on business cards and invoices for the consumer 112. Then, any individual in possession of one of the consumer's business cards or invoices can transfer/pay funds to the consumer's associated account, without concern by the consumer 112 of such individuals withdrawing funds from the account. In some implementations, the token may further be limited as a one-time use token.

In the illustrated embodiment, the computer-readable indicia 118 associated with the access device 114 includes a QR code 118a. In other embodiments, however, the computer-readable indicia 118 may include other indicia such as, for example, barcodes, other visible patterns/symbols, etc. In addition, a design of the computer-readable indicia 118 may include any desired design and, in some implementations, may be used as a brand or acceptance mark to build consumer awareness, etc. (e.g., while indicia 118a is shown as a generally square design in FIG. 1, it could have other designs used as a brand or acceptance mark; etc.).

Also in the illustrated embodiment, the access device 114 is illustrated as a credit card 114a, and the computer-readable indicia 118 includes the QR code 118a printed on a portion of the credit card 114a. Alternatively, the computer-readable indicia 118 may include a sticker comprising the QR code 118a (or another code, pattern, symbol, etc.), issued to the consumer 112 by the financial institution 104, which the consumer 112 can then glue or otherwise affix to the access device 114 (or to another object, such as another credit/debit card, a business card, a mobile phone case, a keychain, a radio frequency (RF) shield pocket/pouch, etc.). Here, the sticker may be distributed with instructions indicating how/where to affix the sticker to the access device 114 (or other object). As a sticker to be placed on the credit card 114a, for example, the QR code 118a may be printed and supplied to the consumer 112 in a PIN mailer, etc. Further, in other embodiments, the computer-readable indicia 118 may be associated with the access device 114 (or other object) via other operations such as, for example, embedding, embossing, painting, engraving, laser-etching, printing, or any other means for affixing or otherwise associating the indicia 118 with the access device 114, etc. As an example, the access device 114 may include a radio frequency identification (RFID) element and/or near field communication (NFC) tag, and the computer-readable indicia 118 may be encoded on the RFID element and/or NFC tag, where the RFID element and/or NFC tag are associated with a payment network compatible contactless payment application and where the indicia 118 is readable and/or retrieved as a payment application PAN (or other RFID/NFC solution where the indicia 118 can be retrieved). As another example, the computer-readable indicia 118 may be provided to the consumer 112 electronically (e.g., via email, etc.), and the consumer 112 can then print the computer-readable indicia as desired (e.g., on stickers, directly on the access device 114, on business cards, on invoices, etc.).

In some embodiments, computer-readable indicia relating to accounts of consumers may include indicia that is invisible to the human eye, but detectable by a computing device (such as computing device 200), for example, via RFID technology, Bluetooth technology, or the like. In addition, in some embodiments, computer-readable indicia may include virtual-type indicia that can be displayed, for example, at computing devices (e.g., at a presentation unit 206 of a computing device 200, etc.), and distributed to consumers via network connections (e.g., via communications network 108, etc.).

With continued reference to FIG. 1, the communication device 116 associated with the consumer 110 includes a fund transfer application, through which the communication device 116 is configured to perform various operations described herein relating to transfer of funds. This application may be a stand-alone application provided by the financial institution 104 or the payment network 106, or alternatively the application could be incorporated into other applications from the financial institution 104 or from a digital service provider that holds account details for the consumer 110, such as Amazon®, Facebook®, Alipay®, Apple® and Google®. In any event, the communication device 116 is configured, by the fund transfer application, as defined by executable instructions, to perform as described herein. In particular, the communication device 116 may be configured, by the fund transfer application, to perform as defined by the following exemplary instructions:

above, the fund transfer application may be provided by and/or associated with the financial institution 104 connected with the account for the consumer 110, or it may be provided by and/or associated with the payment network 106 or another part of the system 100 shown (or not shown, such as a digital service provider that holds account details for the consumer 110), for use at the communication device 116.

In an example transaction, the consumer 110 may desire to transfer funds from his/her account (as a source account) to the account of the consumer 112 (as a destination account), for example, via the communication device 116 using various application programming interfaces (APIs) associated with the fund transfer application. The communication device 116 includes an input device (e.g., input device 208, etc.) by which the consumer 110 can scan (or otherwise capture, view, record, interpret, photograph, etc.) the computer-readable indicia 118 of the access device 114 of the consumer 112. For instance, the communication device 116 may include a camera that can capture the QR code 118a (or, alternatively, a barcode, etc.) and interpret the data encoded therein. Alternatively, or additionally, the communication device 116 may include an input device enabling detection/interpretation of RFID signals, NFC signals, or the like.

```
using MasterCard.SDK;
using MasterCard.SDK.Services.MoneySend;
using MasterCard.SDK.Services.MoneySend.Domain;
TransferService service = new TransferService(testUtils.GetConsumerKey( ),
testUtils.GetPrivateKey( ), Environments.Environment.SANDBOX);
PanEligibilityRequest = new PanEligibility Request( );
panEligibilityRequest.ReceivingAccountNumber = 5184680430000014L;
PanEligibility panEligibility = service.GetPanEligibility(panEligibilityRequest);
if PanEligibility <> NULL
{
    TransferRequest transferRequestMapped = new TransferRequest( );
        transferRequestMapped.LocalDate = "1212";
        transferRequestMapped.LocalTime = "161222";
        transferRequestMapped.TransactionReference = 4000000003010101016L;
    transferRequestMapped.FundingMapped.SubscriberId = "sneder@email.com";
    transferRequestMapped.FundingMapped.SubscriberType = "EMAIL_ADDRESS";
    transferRequestMapped.FundingMapped.SubscriberAlias = "My Debit Card";
        transferRequestMapped.FundingUCAF =
"MjBjaGFyYWN0ZXJqdW5rVUNBRjU=1111";
    transferRequestMapped.FundingMasterCardAssignedId = 123456;
        transferRequestMapped.FundingAmount.Value = 15000;
    transferRequestMapped.FundingAmount.Currency = 840;
    transferRequestMapped.ReceivingCard.AccountNumber = 5184680430000014L;
        transferRequestMapped.ReceivingAmount.Value = 182206;
    transferRequestMapped.ReceivingAmount.Currency = 484;
        transferRequestMapped.TransactionDesc = "P2P";
}
Transfer transfer = service.GetTransfer(transferRequestMapped);
```

It should be appreciated that the above code segment is exemplary only, and illustrative of operations described herein, but may be altered and/or expanded upon to perform other operations described herein, or as necessary or desired, and/or to perform operations in one or more different manners.

Further, the fund transfer application may enable the consumer 110, via the communication device 116, upon receiving account information from the consumer 112 (via the computer-readable indicia 118 of access device 114), to transfer funds to the account associated with the consumer 112 from his/her account. In addition, in various embodiments, the fund transfer application also enables the consumer 110, via the communication device 116, to facilitate transfer of funds to his/her account, for example, from the account associated with the consumer 112, etc. As indicated Alternatively, the consumer 112 may provide the computer-readable indicia 118 to the consumer 110, for example, in an electronic form such an image in an email, within a PDF document attached to an email, or displayed on a web page, etc. The communication device 116 can then be used by the consumer 110 to access the electronic form of the indicia 118, via suitable techniques (e.g., using reading functionality in an email client, web browser, etc.), and thereby include the indicia (and any account information therein) in the fund transfer application.

In any case, upon scanning the computer-readable indicia 118, the communication device 116 (e.g., a processor 202 associated therewith, etc.), via the fund transfer application, interprets the encoded information (at the indicia 118) and extracts the account identifier and other information for the account of the consumer 112. The communication device 116 also receives an input from the consumer 110 regarding a fund transfer amount and account information associated with his/her own source account to facilitate the transfer (alternatively, the source account information to be used in the transfer by the consumer 110 may already be present in the fund transfer application). The input from the consumer 110 regarding his/her account information may include a manual entry of his/her PAN for the source account, a scan of a computer-readable indicia associated with the source account (e.g., on a banking card associated with the consumer 110, etc.), etc. In some embodiments, other information extracted from the computer-readable indicia may include recipient customer data to support the processing and reconciliation of the payment, for example, a payment amount, an invoice identifier (e.g., an invoice number, etc.), a product identifier, combinations thereof, etc. (potentially depending on where the computer-readable indicia 118 is located).

In some embodiments, the fund transfer application may alternatively be associated with a kiosk (or other device independent of the consumer 110), to allow transfers between the consumer 110 and the consumer 112, for example, when the customer 110 does not have the communication device 116, or other suitable personal device, or network connectivity.

Upon receiving the fund transfer details, and when the fund transfer application is provided by and/or associated with the financial institution 104, the communication device 116, via the fund transfer application, may effect a push transaction to debit the appropriate funds from the source account of the consumer 110. Upon success, the payment network 106 (or an API provided by the payment network 106, or by a third party that may or may not be connected to the payment network 106) pushes the fund transfer request to the financial institution 104 (e.g., the destination (or recipient) bank, etc.) associated with the consumer 112, or even potentially directly to the bank account of the consumer 112. Clearing and settlement of the transaction may be immediate or may delayed, for example, depending on the network message type and the payment network 106.

For example, the communication device 116 may compile a transaction request (e.g., a transfer request, etc.) based on the extracted account identifier for the destination account of the consumer 112, the source account data for the consumer 110, and the fund transfer amount. In connection therewith, the communication device 116, via the fund transfer application, submits the request to the financial institution 102 (associated with the source account of consumer 110), along path A in FIG. 1, to initially determine whether the source account of consumer 110 is in good standing and if sufficient funds/credit are present in the account to cover the transfer/transaction. If approved, a response (indicating approval of the transfer) is transmitted from the financial institution 102 to the financial institution 104 (e.g., the recipient bank associated with the destination account of receiving consumer 112 (or a receiving merchant if involved in the transaction instead of consumer 112), etc.), through the payment network 106, such as, for example, through MasterCard®, VISA®, Discover®, American Express®, etc. At the same time, the financial institution 102 may also debit the appropriate funds from the source account and hold them for further processing. The transfer is later cleared and/or settled (via appropriate messages such as clearing messages and/or settlement messages) by and between the financial institutions 102, 104 (by appropriate agreements, and with the financial institution 104 acting as an issuer of the receiving consumer 112 (or as an acquirer for a receiving merchant where involved in the transaction), for example).

As previously described, in various embodiments the fund transfer application may be provided by and/or associated with the payment network 106, or a digital service provider that holds account details for the consumer 110. In such embodiments, upon receiving the fund transfer details, the communication device 116 compiles a transaction request and, via the application, initiates an API call to the financial institution 104 or to the payment network 106 in connection with submitting the request. For example, the payment network 106 may provide the fund transfer application, for use at the communication device 116, and may directly provide services to initiate the fund transfer at the payment network 106 via APIs. Here, the payment network 106 may then communicate with the financial institution 102 to determine whether the source account of consumer 110 is in good standing and if sufficient funds/credit are present in the account to cover the transfer/transaction. The request is then processed, by the payment network 106, in a similar manner to above.

In another example transaction, the consumer 110 may desire to transfer funds from his/her account (as a source account) to a merchant, to effect payment of an invoice (where the account of the merchant is the destination (or recipient) account), for example, via the consumer's communication device 116 using various APIs associated with the fund transfer application. The communication device 116 again includes an input device (e.g., input device 208, etc.) by which the consumer 110 can scan (or otherwise capture, view, record, interpret, photograph, etc.) a computer-readable indicia of at an invoice of the merchant. In turn, the payment application effects a pull transaction to transfer the appropriate funds from the consumer 110 to the merchant. Here, the payment network 106 (or a service manager acting on behalf of the payment network 106 or on behalf of a third party) determines an acquirer of the recipient merchant, for example, based on merchant ID-acquirer mapping info stored during merchant registration, etc., and routes a transaction request (e.g., a transaction message, etc.) to the acquirer. The acquirer will then submit the transaction request to the payment network 106 for processing, and the financial institution 102 of the consumer 110 will check balance and good standing of the consumer's account and send an authorization reply (e.g., a confirmation message, etc.) to the acquirer via the payment network 106. Again, clearing and settlement may be immediate or delayed depending, for example, on the network message type and/or the payment network 106.

Transaction data is generated, collected, and stored as part of the above interactions among the financial institutions 102, 104, the payment network 106, and the consumers 110, 112 (and included in the various messages). The transaction data includes, for example, authorization, clearing and/or settlement data, etc. The transaction data, in this exemplary embodiment, is stored at least by the payment network 106 (e.g., in a data structure associated with the payment network 106, etc.). Additionally, or alternatively, the financial institutions 102, 104 may store the transaction data, or part thereof, in a data structure, or transaction data may be transmitted between parts of system 100 as used or needed. In general, such transaction data may include, for example, PANs and/or tokens for consumers involved in the fund transfers, amounts of transfers, consumer name, consumer message, other data associated with the involved accounts, dates/times of the transfers, etc. It should be appreciated that more or less information related to fund transfers, as part of either authorization or clearing and/or settlement, may be included in transaction records and stored within the system 100.

In various exemplary embodiments, the consumers (e.g., consumers 110, 112, etc.) involved in the different transactions herein agree to legal terms associated with their accounts, for example, during enrollment in their accounts, etc. In so doing, the consumers may voluntarily agree, for example, to allow various parts of the system 100 to use data collected during enrollment and/or collected in connection with processing the various transactions herein, subsequently for one or more of the different operations described herein.

FIG. 3 illustrates an exemplary method 300 for use in processing fund transfers between consumers, in accordance with the description herein. In particular, the method 300 is described with reference to a transfer of funds between consumer 110 and consumer 112 in the system 100, and with additional reference to the financial institutions 102, 104 and the payment network 106. The method 300 is also described with reference to computing device 200. It should be appreciated, however, that the methods herein are not limited to the system 100 and the computing device 200, and that the systems and computing devices herein are not limited to method 300.

In the method 300, the accounts associated with the consumers 110, 112 are payment accounts. And, the access device 114 associated with the consumer 112 is the credit card 114*a* having the QR code 118*a* (as the computer-readable indicia 118). In addition, the method 300 is described in connection with the consumer 110 transferring funds from his/her payment account to the payment account associated with the consumer 112. In connection therewith, the payment account of the consumer 112 is referred to as the destination account, and the payment account of the consumer 110 is referred to as the source account. It should be appreciated, however, that the present disclosure is not limited by this description, and that access devices other than the credit card 114*a* and computer-readable indicia other than the QR code 118*a* may be used in other embodiments.

With reference to FIG. 3, initially in the method 300 (e.g., in a distribution phase, etc.), the financial institution 104 (acting as an issuer in this example) provides the credit card 114*a* with the QR code 118*a* thereon to the consumer 112. Alternatively, the financial institution 104 may provide the QR code 118*a* on a separate medium that is then capable of being affixed to the credit card 114*a* (or to another device, as desired by the consumer 112).

In either case, through the QR code 118*a*, the financial institution 104 encodes, at 302, at the least, an account identifier onto the credit card 114*a* (and, in some embodiments, additional information relating to the consumer 112 and/or the consumer's payment account). For example, the QR code 118*a* may include (or may be representative of) the PAN associated with the destination payment account of the consumer 112 (such that it can subsequently be used to identify the consumer's account). In addition, the QR code 118*a* may include information identifying a name of the payment account, a name of the consumer 112 associated with the payment account, and a name of the financial institution 104 that provided the payment account. The financial institution 104 then distributes, at 304, the credit card 114*a* (or other medium) with the QR code 118*a* thereon to the consumer 112. Such distribution may be done physically via mail or other appropriate means of shipping, or virtually via communications network 108.

As an example, the QR code 118*a* may include a 25×25 pixel QR Code (version 2), which carries twenty-nine alphanumeric error corrected characters. As part of these characters, the QR code 118*a* may contain, for example (and without limitation), a code ID, a version ID, a code bit map, and an account identifier for the destination account of the consumer 112 (e.g., the PAN in the method 300, but alternatively a token, etc.). Optionally, in implementations where the QR code 118*a* is used for billing purposes (and potentially included on invoices for a merchant, instead of a credit card or other payment device), it may also contain, for example (and without limitation), an invoice ID and/or product identifier, an invoice amount, and a currency code.

When the consumer 110 desires to initiate a fund transfer transaction to the consumer 112 (e.g., in a transfer phase, etc.), the consumer 112 provides the credit card 114*a* to the consumer 110 and the consumer 110 scans (or otherwise reads), at 306, the QR code 118*a* on the credit card 114*a* to retrieve the account identifier for the destination payment account. For example, the consumer 110 may scan the QR code 118*a* using a camera input device 208 of the communication device 116, as allowed and/or configured by the fund transfer application thereon. The consumer 110 may then also provide a transfer amount to the communication device 118 (e.g., via an input device 208, etc.) and select the source payment account from which the funds are to be transferred (e.g., manually, from a predefined list of accounts, from a scan of another computer-readable indicia, etc.). In turn, the communication device 116 (and the fund transfer application) receives the fund transfer amount, at 308, and the selection of the source payment account, from where the funds are to be transferred, at 310.

Next, the communication device 116, via the fund transfer application, compiles a transaction request for the transfer, at 312, and submits (or delivers) the request, at 314, as appropriate (e.g., to the financial institution 102, to the payment network 106, etc. directly or via APIs, depending on the source of the fund transfer application; etc.). The transaction request is generally based on the encoded account identifier retrieved by scanning the QR code 118*a*, the fund transfer amount entered by the consumer 112, and the details of the source account from which the funds are to be transferred. The request may also include data necessary for interpretation by other parts of the system 100, for example, according to standard protocols or the like. The transaction request is typically above other network messages in the system 100 (e.g., authorization request messages, etc.). However, it is contemplated that in at least one embodiment, the transaction request may include formatting/encoding according to ISO 8583, which is a standard for transaction messages established by the International Organization for Standardization. And, in particular, it is contemplated that the transaction request may include a message type indicator (MTI) of "0100", indicating that the request is for authorization of the fund transfer/transaction by the financial institution 102, associated with the source payment account of the consumer 110.

In some embodiments, the transaction request may include flags/flag bits to indicate settings and/or parameters that apply to the transfer. For instance, a flag may be set in the transaction request indicating that only deposits are allowed to the destination account and withdrawals from the destination account are forbidden. Then, when an entity (e.g., financial institution 104 associated with the destination account of the consumer 112 in the above example, etc.) receives a transaction request including such a flag and the transaction request includes a withdrawal request/instruction, the financial institution may decline or refuse to complete the transfer/transaction.

FIG. 4 illustrates an example graphical user interface 400 that may be associated with the fund transfer application included at the communication device 116. The interface 400 may be used by the consumer 110 to enter the necessary transfer information to cause the fund transfer to the consumer 112. It should be understood that the interface 400 is exemplary in nature, and is not limiting. Other embodiments may include more or different interfaces with more, fewer, or different elements therein.

As shown in FIG. 4, the interface 400 includes a screen output 402 that displays a view from a camera (broadly, an input device 208) of the communication device 116. The center of the screen output 402 includes an overlay 404 indicating how to arrange the QR code 118a from the credit card 114a (broadly, a computer-readable indicia) in relation to the camera, in order for the QR code 118a to be properly scanned/captured by the communication device 116. The overlay 404 represents the portion of the QR code 118a, captured by the picture/camera, that will be analyzed by the communication device 116 (e.g., via processor 202, etc.), as instructed by the fund transfer application, to interpret the QR code 118a. Alternatively, the screen output 402 may not include an overlay 404, and the entire photo captured by the camera may be analyzed to discover and interpret any computer-readable indicia that may be present therein. A scan button 406 then enables the consumer 110 to activate the camera and capture the QR code 118a (e.g., when it is properly aligned in the overlay 404, etc.). In some embodiments, the communication device 116, via the fund transfer application, may be configured to detect automatically when a computer-readable indicia is lined up with the camera, and scan/capture the indicia at that time.

The interface 400 also includes an amount section 408 that enables the consumer 110 to input the amount of funds to transfer to the consumer 112. The amount may be directly entered into the section 408 (e.g., via a keypad, via voice command, etc.), or it may be selected from predefined amounts as part of a drop-down menu, etc. A source account section 410 is provided generally below the amount section 408 to allow the consumer 110 to either directly input the account information for the source account, or to select the source account from other available accounts, from which the funds are to be transferred. When the interface 400 includes information for only a single account, the source account section 410 may be automatically populated by default into the source account section 410. However, when the interface 400 includes information for multiple accounts, the source account section 410 may either populate with the first account in the listing of multiple accounts, or with another account selected by the consumer 110 to be the default account, or may allow the consumer 110 to select a desired one of the multiple accounts using a drop down control 412. In any case, once the desired data is received in the interface 400, the consumer 110 can select a send payment button 414 to cause the fund transfer to be initiated as well as, potentially, a transaction request for the transaction. In some embodiments, the send payment button 414 may be deactivated until all of the information (e.g., the scan of the QR code 118a, the transfer amount, and the source account, etc.) is selected on the interface 400.

While in the illustrated interface 400 the source account section 410 is shown as utilizing the drop down control 412, other configurations may be used, such as, for example, a multi-row selection window, a set of buttons, or the like. In addition, it should be understood that, while the elements of the interface 400 are arranged in one order, other embodiments of fund transfer application interfaces may include more, fewer, or different elements in different orders, arrangements, or the like. For instance, in some embodiments, a payment memo, or message, may be provided by the sender of the fund transfer in the payment request, which enables the sender to provide information to the recipient of the fund transfer, such as a purpose of the transfer or specific details pertaining to the transfer. Further, in some embodiments, once a computer-readable indicia is scanned, the screen output 402 may indicate and/or display information about the associated destination account, such as an account owner name or financial institution name, and account identifier (e.g., a PAN, etc.), etc. As described above, this additional information may be encoded in the computer-readable indicia. The indication or display of such information may then be used by the consumer 110, for example, to confirm that the destination account information conforms to the destination desired for the fund transfer.

With reference again to FIG. 3, when the financial institution 104 provides and/or is associated with the fund transfer application (or when another part of the system 100 provides and/or is associated with the fund transfer application and imitates an API call to the financial institution 104 in connection with submitting the transaction request at 314), the financial institution 102 receives the transaction request from the communication device 116, at 316. In turn, the financial institution 102 extracts the encoded account identifier from the request, at 318, and identifies the destination payment account of the consumer 112, at 320, based on the extracted account identifier. As described above, in the method 300, the account identifier includes the PAN associated with the destination account for the consumer 112. As such, upon determining the PAN, the financial institution 102 can identify the destination payment account.

Alternatively, when the fund transfer application is provided by and/or is associated with another part of the system 100 (e.g., the payment network 106, a digital service provider that holds account details for the consumer 110, etc.), the communication device 116 associated with the consumer 110 may imitate an API call to the payment network 106 in connection with submitting the transaction request at 314. Here, the payment network 106 receives the transaction request from the communication device 116, at 316. In turn, the payment network 106 extracts the encoded account identifier from the request, at 318, and identifies the destination payment account of the consumer 112, at 320, based on the extracted account identifier. As described above, in the method 300, the account identifier includes the PAN associated with the destination account for the consumer 112. As such, upon determining the PAN, the payment network 106 can identify the destination payment account and effect the fund transfer, as appropriate.

As described above, the QR code 118a may include a 25×25 pixel QR Code (version 2), which carries twenty-nine alphanumeric error corrected characters. As part of these characters, the QR code 118a may contain, for example (and without limitation), the code ID, the version ID, the code bit map, and the account identifier the destination account of the consumer 112 (e.g., the PAN in the method 300, but alternatively a token, etc.). The QR code 118a can be decoded by the communication device 116 following generally known standards defined for QR codes (based on the 25×25 pixel (version 2) configuration, etc.), and the various elements (or characters) encoded in the QR code 118a then used to build/compile the funds transfer request. The financial institution 102 (or payment network 106, which may define an API the communication device 116 must follow) will then receive the data according to specifications it has defined.

Finally, after the destination account is identified, in this example, the financial institution 102 initiates the fund transfer, at 322, from the source account of the consumer 110 to the destination account of the consumer 112. In some embodiments, the fund transfer may be completed by the financial institution 102 by transferring the funds to the financial institution 104, or by simply appending the transfer amount to the destination account of the consumer 112 (or by combinations thereof). Alternatively, additional approval may be required from the consumer 110, such that the financial institution 102 initiates a fund transfer as described above only after such further approval.

In some embodiments, one or more of the financial institutions 102, 104 may transmit a reply to the consumer 110, at the communication device 116, with a confirmation of the fund transfer. Alternatively, if the fund transfer fails, the communication device 116 may receive notice of the failure and/or a reason for the failure.

In view of the above, the systems and methods herein may enable consumers to execute a fund transfer from a source account to a destination account based on scanning computer-readable indicia including a destination account identifier into a fund transfer application. The application may include selecting a source account and a transfer amount. The destination account identifier may be used by the appropriate financial institution to determine the destination account such that the fund transfer is completed.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) causing a destination account identifier associated with a destination account to be encoded on a medium as computer-readable indicia, wherein the destination account identifier enables deposits to the destination account and does not enable withdrawals from the destination account; (b) causing the medium to be delivered to a consumer; (c) capturing at least one symbol representative of the destination account identifier associated with the destination account; (b) identifying a source account; (c) receiving at least one payment parameter; (d) causing a fund transfer transaction based on the destination account identifier, the source account identifier, and the at least one payment parameter, whereby a payment from the source account to the destination account is initiated; (e) receiving, in connection with the fund transfer transaction, a transaction request associated with the destination account; (f) when the transaction request includes the destination account identifier, causing, by the computing device, a transaction to be applied to the destination account; and (g) declining the transaction when the transaction includes a debit from said destination account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for facilitating identification of a destination account participating in a fund transfer from a source account associated with a user, the method comprising:
capturing, by a computing device, a computer-readable indicia representative of: a destination account identifier specific to a destination account of a first party and a name of the first party associated with the destination account, the computer-readable indicia including a quick response (QR) code disposed on an object associated with the first party, wherein the destination account identifier is a deposit-only identifier for the destination account;
in response to the captured computer-readable indicia, displaying, by the computing device, the name of the first party, from the captured computer-readable indicia, as a confirmation that the first party is associated with the destination account;
identifying, by the computing device, a payment amount for a fund transfer from a source account to the destination account, based on at least one user input at the computing device; and
compiling, by the computing device, and transmitting a transfer request for the fund transfer, the transfer request including the destination account identifier, a source account identifier associated with the source account, and the identified payment amount for the fund transfer, thereby initiating the fund transfer for the payment amount from the source account to the destination account based on the transfer request.

2. The computer-implemented method of claim 1, further comprising identifying, by the computing device, the source account identifier associated with the source account based on a selection of the source account received at the computing device or based on the source account being a default account.

3. The computer-implemented method of claim 1, wherein the destination account identifier includes one of a primary account number (PAN) of the destination account and a token associated with the destination account.

4. The computer-implemented method of claim 1, wherein the computer-readable indicia is further representative of an invoice identifier; and
wherein the transfer request includes the invoice identifier.

5. The computer-implemented method of claim 1, wherein capturing, by the computing device, the computer-readable indicia includes photographing the computer-readable indicia with a camera of the computing device.

6. The computer-implemented method of claim 1, wherein compiling the transfer request for the fund transfer further comprises including a flag in the transfer request indicating that only deposits are permitted to the destination account.

7. The computer-implemented method of claim 1, further comprising receiving, from the user, an input confirming to proceed in the fund transfer, prior to compiling and transmitting the transfer request.

8. The computer-implemented method of claim 1, further comprising receiving, by the computing device, from the user, a payment memo; and
wherein the transfer request further includes the payment memo.

9. A non-transitory computer-readable storage medium including computer executable instructions for facilitating a payment between a source account and a destination account, which, when executed by a processor of a computing device, cause the processor to:
capture a computer-readable indicia associated with a destination account from a card associated with a first party, wherein the destination account is associated with the first party, wherein the computer-readable indicia includes a static barcode or quick response (QR) code, wherein the computer-readable indicia is indicative of: a destination account identifier for the destination account and a name associated with the destination account, the destination account identifier being a deposit-only identifier for the destination account;
in response to the captured computer-readable indicia, display, at a fund transfer interface, the name associated with the destination account from the captured computer-readable indicia to a user associated with a source account;
identify a payment amount for a payment from a source account to the destination account, based on at least one user input at the computing device; and
compile and transmit a fund transfer request for the payment from the source account to the destination account, the fund transfer request including the destination account identifier from the captured computer-readable indicia, data specific to the source account, and the identified payment amount, thereby initiating the payment for the payment amount from the source account to the destination account, based on the fund transfer request.

10. The non-transitory computer-readable storage medium of claim 9, wherein the computer executable instructions, when executed by the processor, cause the processor to further display the payment amount.

11. The non-transitory computer-readable storage medium of claim 9, wherein the computer executable instructions, when executed by the processor, further cause the processor to:
identify, from the user, the source account associated with the user based on: a selection from the user of the source account or a default associated with the source account.

12. The non-transitory computer-readable storage medium of claim 9, wherein the destination account identifier includes one of a primary account number (PAN) of the destination account and a token associated with the destination account.

13. The non-transitory computer-readable storage medium of claim 9, wherein the computer-readable indicia is further indicative of an invoice identifier; and
wherein the fund transfer request includes the invoice identifier.

14. The non-transitory computer-readable storage medium of claim 9, wherein the computer executable instructions, when executed by the processor, cause the processor, in order to compile the fund transfer request, to set a flag in the fund transfer request indicating that only deposits are permitted to the destination account.

15. The non-transitory computer-readable storage medium of claim 9, wherein the computer executable instructions, when executed by the processor, further cause the processor to receive, from the user, an input confirming to proceed with the payment after displaying the name associated with the destination account and prior to transmitting the fund transfer request.

* * * * *